(12) United States Patent
Harper et al.

(10) Patent No.: US 9,765,901 B2
(45) Date of Patent: Sep. 19, 2017

(54) FLUID FLOW CONTROL VALVES

(71) Applicant: Warwick Music Limited, Coventry (GB)

(72) Inventors: Karl Harper, Swadlincote (GB); Matthew Robert Pope, Swadlincote (GB)

(73) Assignee: WARWICK MUSIC LIMITED, Coventry (GB)

( * ) Notice: Subject to any disclaimer, the term of this patent is extended or adjusted under 35 U.S.C. 154(b) by 0 days.

(21) Appl. No.: 14/648,783

(22) PCT Filed: Dec. 11, 2013

(86) PCT No.: PCT/GB2013/000540
§ 371 (c)(1),
(2) Date: Jun. 1, 2015

(87) PCT Pub. No.: WO2014/096754
PCT Pub. Date: Jun. 26, 2014

(65) Prior Publication Data
US 2015/0317961 A1 Nov. 5, 2015

(30) Foreign Application Priority Data

Dec. 19, 2012 (GB) .................................. 1222977.9

(51) Int. Cl.
*G10D 9/04* (2006.01)
*G10D 7/10* (2006.01)
*F16K 31/08* (2006.01)

(52) U.S. Cl.
CPC ............. *F16K 31/086* (2013.01); *G10D 7/10* (2013.01); *G10D 9/04* (2013.01)

(58) Field of Classification Search
CPC ................................. G10D 9/04; F16K 31/086
(Continued)

(56) References Cited

U.S. PATENT DOCUMENTS

| 887,120 | A | * | 5/1908 | Paulson | G10D 9/04 84/388 |
| 1,922,685 | A | * | 8/1933 | Johnson | G10D 9/04 251/324 |

(Continued)

FOREIGN PATENT DOCUMENTS

| GB | 1444393 | A | * | 7/1976 | ........... F16K 31/086 |
| GB | 2209087 | A | * | 4/1989 | ............... G10D 9/04 |

(Continued)

OTHER PUBLICATIONS

International Search Report for related PCT Application No. PCT/GB2013/000540, mailed Jun. 25, 2014.

*Primary Examiner* — David Warren
*Assistant Examiner* — Christina Schreiber
(74) *Attorney, Agent, or Firm* — Troutman Sanders LLP; Ryan A. Schneider; Chris N. Davis

(57) ABSTRACT

A fluid flow control valve comprising an outer casing with an inner valve member displaceable between first and second positions within the casing, the valve member including passages which interconnect different valve inlets and outlets dependent on whether the valve member is in its first or second position, the valve member being made from plastic material so that the diameter of the valve member can be increased without increasing its weight above that of a conventional metal inner valve member. This allows the passages through the inner valve member to be of the same internal diameter as the tubing leading up to and away from the valve. The valve member can be acted upon by a magnetic restoring means which tends to return the valve member towards its first position when displaced therefrom.

14 Claims, 16 Drawing Sheets

(58) Field of Classification Search
USPC .......................................................... 84/392
See application file for complete search history.

(56) References Cited

U.S. PATENT DOCUMENTS

| | | | | |
|---|---|---|---|---|
| 2,533,388 A * | 12/1950 | Meyers | ............... | G10D 7/10 84/397 |
| 2,795,162 A * | 6/1957 | Eash | ............... | G10D 7/10 84/397 |
| 3,030,846 A * | 4/1962 | Greenleaf | ............... | G10D 9/04 84/388 |
| 3,420,133 A * | 1/1969 | Proll | ............... | G10D 9/04 446/205 |
| 3,660,588 A * | 5/1972 | Richardson | ............... | G10D 7/10 84/397 |
| 3,835,748 A * | 9/1974 | Olson | ............... | G10D 9/04 84/388 |
| 4,127,052 A * | 11/1978 | Thayer | ............... | G10D 9/04 84/388 |
| 4,210,056 A * | 7/1980 | Ciccarelli | ............... | G10D 9/04 84/392 |
| 4,527,456 A * | 7/1985 | Perkins | ............... | G10H 1/00 84/654 |
| 4,696,454 A * | 9/1987 | Hamanaga | ............... | G10D 9/04 251/321 |
| 4,757,738 A * | 7/1988 | Armstrong | ............... | G10D 9/04 84/2 |
| 4,766,797 A * | 8/1988 | Jones | ............... | G10D 9/00 84/397 |
| 5,052,261 A * | 10/1991 | Lessen | ............... | G10D 9/04 84/388 |
| 5,361,668 A * | 11/1994 | Andersen | ............... | G10D 9/04 84/392 |
| 5,450,871 A * | 9/1995 | Reinicke | ............... | F16K 11/04 137/15.19 |
| 5,900,563 A * | 5/1999 | Leonard | ............... | G10D 9/04 84/389 |
| 6,018,115 A * | 1/2000 | Leonard | ............... | G10D 9/04 84/387 R |
| 7,161,077 B1 * | 1/2007 | Fry | ............... | G10D 9/04 84/387 R |
| 2003/0167897 A1 * | 9/2003 | Wedgwood | ............... | G10D 9/00 84/388 |
| 2005/0016356 A1 * | 1/2005 | Shire | ............... | G10D 9/04 84/395 |
| 2006/0196342 A1 * | 9/2006 | Laukat | ............... | G10D 7/10 84/387 R |
| 2007/0234887 A1 * | 10/2007 | Sawada | ............... | G10D 9/04 84/723 |
| 2010/0236379 A1 * | 9/2010 | Wilk | ............... | G10D 9/04 84/390 |

FOREIGN PATENT DOCUMENTS

| | | | | |
|---|---|---|---|---|
| GB | 2270554 A * | 3/1994 | ............ | B29C 39/26 |
| GB | 2297144 A * | 7/1996 | ......... | B29C 33/0033 |
| GB | 2461562 A * | 1/2010 | ............ | G10D 7/10 |
| JP | 2008139767 A * | 6/2008 | | |
| KR | 20100087584 A * | 8/2010 | | |

* cited by examiner

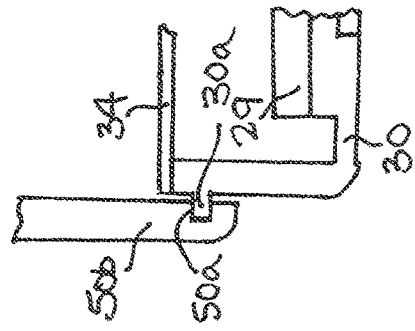
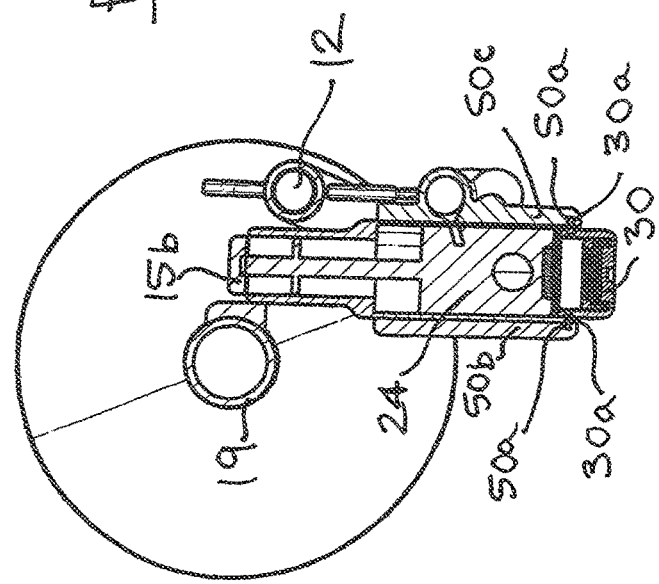
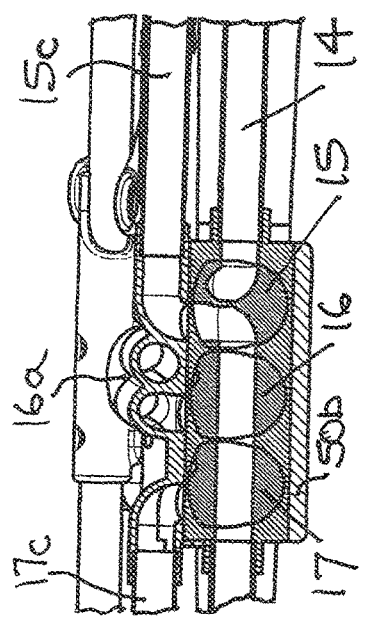
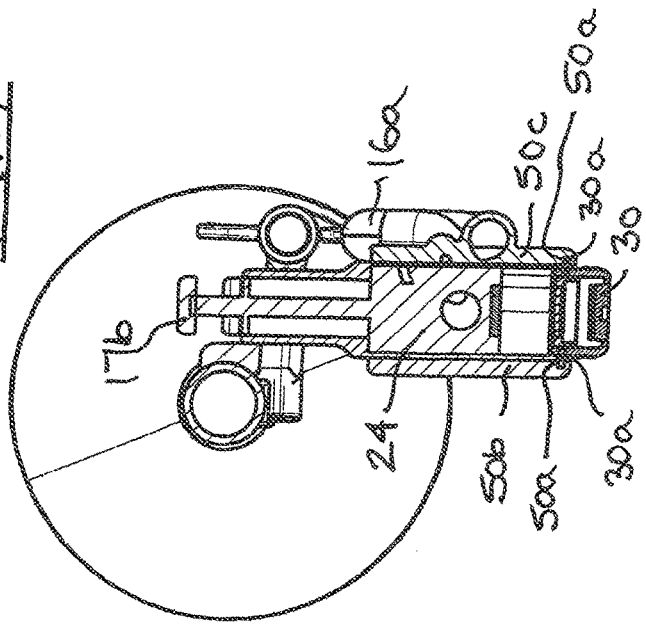

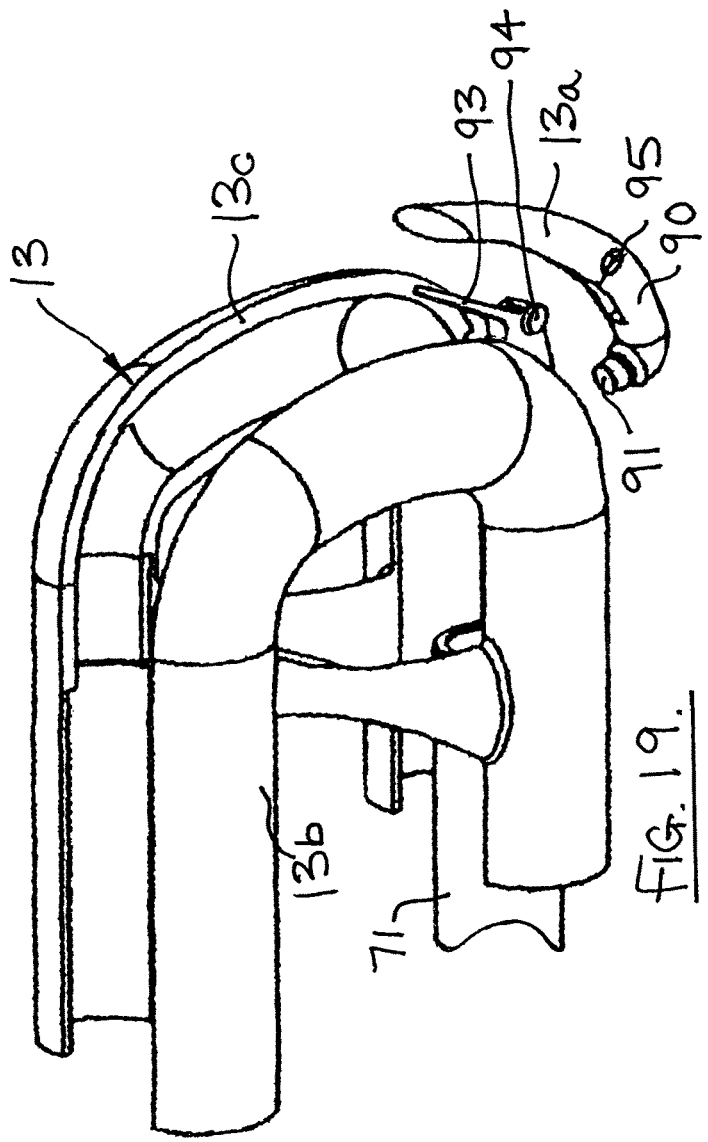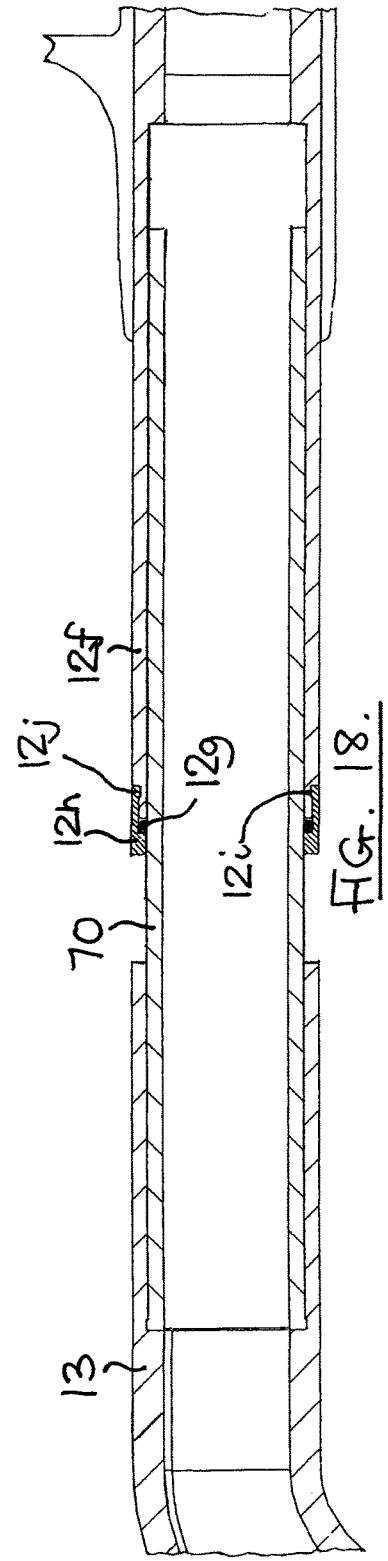

FLUID FLOW CONTROL VALVES

CROSS-REFERENCE TO RELATED APPLICATIONS

This application is a US National Stage of International Application No. PCT/GB2013/000540 filed 11 Dec. 2013, which claims the benefit of GB 1222977.9 filed 19 Dec. 2012, each herein fully incorporated by reference.

This invention relates to fluid flow control valves and in particular though not exclusively to such valves used in valved musical instruments such as trumpets, comets, flugel horns, french horns, alto or tenor horns, baritone horns, euphoniums, alto trombone, tenor trombones, bass trombones, mellophones, sousaphones, tubas, the marching equivalents of the listed instruments and all other valved brass wind instruments.

Such a fluid flow control valve arrangement suitable for use in a musical instrument typically comprises an outer casing with an inner valve member displaceable between first and second positions within the casing, the valve member including passages which interconnect different valve inlets and outlets dependent on whether the valve member is in its first or second position, the valve member being acted upon by a restoring means which tends to return the valve member towards its first position.

Such valves are relatively expensive to manufacture as they require accurate machining of the various inlets, outlets and passages. Also because the diameter of the inner valve member is relatively small (typically 16 mms) it is not possible for the diameter of the passages passing through the inner valve member to be of the same diameter as that of the instrument tubing which leads up to and away from the inner valve member and the internal walls of these passages often intrude into adjacent passages further restricting air flow through the instrument. These air flow restrictions due to reduced passage diameter and adjacent passage intrusion adversely affect the sound and playability of the instrument.

It is an object of the present invention to provide a valve which addresses the above problems and seeks to provide an improved and more economical instrument.

Thus according to the present invention there is provided a fluid flow control valve suitable for use in a musical instrument, the valve comprising an outer casing with an inner valve member displaceable between first and second positions within the casing, the valve member including passages which interconnect different valve inlets and outlets dependent on whether the valve member is in its first or second position, the inner valve member being acted upon by a restoring means which tends to return the valve member towards its first position and being made from plastics material.

The lighter weight of a plastics inner valve member allows the diameter of the valve member to be increased from say 16 mms to 26.5 mms without increasing the inertia of the inner valve member beyond that of a conventional metal inner valve member so that the speed of operation of the valve is still retained. The larger diameter inner valve member allows the diameter of the passages through the inner valve member to be the same diameter (typically 11.7 mms) as the internal diameter of the tubing of the instrument leading up to and away from the valve member.

Thus preferably the diameter of the passages through the inner valve member are the same diameter as the internal tubing diameter of the tubing of the associated instrument leading up to and away from the valve member. This greatly improves the smooth flow of air through the instrument improving tone and playability.

The leadpipe which supports the mouth piece of the instrument conventionally includes a restriction and other restrictions can be provided deliberately at different positions along the tubing to improve tone.

The present invention also provides a fluid flow control valve for use in a musical instrument in which air is blown through the valve via tubing and hence to an instrument bell, the valve comprising an outer casing with an inner valve member displaceable between first and second positions within the casing, the valve member including passages which interconnect different valve inlets and outlets dependent on whether the valve member is in its first or second position, the inner valve member being acted upon by a restoring means which tends to return the valve member towards its first position when displaced therefrom, the diameter of the passages through the inner valve member being of the same diameter as the internal tubing diameter of the tubing of the associated instrument leading up to and away from the valve member.

The inner valve member may include an insert housed in a recess in the inner member, the insert containing all or part of the passages. This insert may be formed as a plastics moulding or may be machined from a solid mass. The remainder of the inner member may also be moulded or machined from a solid mass The outer casing of the valve may also a plastics moulding.

To reduce the volume within the inner valve member occupied by the bends in the internal passages, the internal passage bends may sweep around a centre which is the inside point of the passage bend. This passage bend configuration can also be used outside the inner valve member when space is restricted.

The valve member has a non-symmetrical cross section and slides in a complementary non-symmetrical bore in the casing.

The inner valve members may have a non-symmetrical cross section and slide in a complementary non-symmetrical bore in the casing or may be of circular cross section with an anti-rotation formation on the valve member and casing.

The cross-section of the valve member and casing bore can be designed to provide flatter areas where the various inlets, outlets and passages are located. This provides better sealing and reduces wear.

The valve may have a first inlet for incoming fluid and a first outlet which are connected for the flow of fluid via a first passage in the valve member when the valve member is in its first position, the valve member also having a second passage connecting the first inlet to a second outlet, when the valve member is in its second position, for supplying fluid flow to an alternative flow path, and a third passage connecting the first outlet to a second inlet, when the valve member is in its second position, to direct return flow from the alternative flow path to the first outlet.

The first passage of the valve may be offset from the centre line of the valve member to provide more room for the second and third passages through the valve member.

The restoring means may be a compression spring, the spring being metal or plastics, or may be magnetic.

When a magnetic restoring means is used this may comprise a first magnetic means carried on the valve member and a second opposing magnetic means carried by the casing which opposes movement of the valve member away from its first position.

This basic magnetic restoring means provide a restoring force which is not linear and which rises exponentially as the valve member is displaced away from the first position.

This can be improved by movably mounting the second magnetic means on the casing so that the second magnetic means moves away from the valve member as the valve member is moved away from its first position and a third magnetic means may be mounted on the casing which opposes the movement of the second magnetic means away from the valve member to provide a more linear restoring force on the valve member.

The position of the third magnetic means relative to the casing may be adjustable to enable the restoring force to be adjusted.

The magnetic restoring means may be electro-magnetic and may be operated in a wired or wireless manner.

Electrical or electronic input and/or output may be is applied to and/or received from the electro-magnetic restoring means to enable remote operation of the valve.

The non-linear restoring means may be used in a fluid flow control valve with or without the plastics inner valve member thus the present invention also provides a fluid flow control valve comprising an outer casing with an inner valve member displaceable between first and second positions within the casing, the valve member including passages which interconnect different valve inlets and outlets dependent on whether the valve member is in its first or second position, the inner valve member being acted upon by a restoring means which tends to return the valve member towards its first position when displaced therefrom, the restoring means being magnetic and providing a restoring force which is not linear and which rises exponentially as the valve member is displaced away from the first position.

The invention also provides a valve assembly comprising a series arrangement of valves of the form described above housed in a common block or outer casing.

Each valve of the assembly may have a first inlet for incoming air and a first outlet leading to a bell section of an associated instrument which are connected for the flow of air via the valve member when the valve member is in its first position, the valve having a second outlet to an additional pipe loop and a second inlet leading back from the pipe loop to the valve which allow flow of air around the additional pipe loop and back to the first outlet via the valve member when the valve member is in its second position.

The first outlet of one valve may be connected to the first inlet of the next valve in the series arrangement and these connections between adjacent valves may be axially aligned for smother flow through the valve assembly.

Such a series aligned valve arrangement not only promotes smoother air flow through the instrument but also allows the construction of each valve in the series arrangement to be identical thus providing a significant manufacturing economy. These valves may alternatively be combined into a single valve block or may be connected with each other in the series arrangement by short lengths of piping.

The single valve block construction is particularly suitable for manufacture from plastics material whereas the individual valves connected by short lengths of piping is more appropriate if the valves are made from a metal such as brass as it reduces the volume of metal used and thus makes the weight of the valve arrangement acceptable. If desired the individual valves could also be of a plastics construction.

The invention also provides a musical instrument including a valve or valve assembly of the form described above.

The musical instrument may be in the form of a trumpet or any of the above listed instruments.

The instrument may comprising a mouth piece supported in a lead pipe, leading to a tuning slide, leading to a valve block including three valves in series and associated valve slide sections, the valve assembly leading to bell section.

The lead pipe may include a restriction as described in the published PCT patent application No. WO2010/122289.

The lead pipe, tuning slide, valve block, valves, associated valve slide sections and bell and all connecting tubing may also be moulded from plastics material.

The leadpipe may be supported from the bell section by sleeves carried by the bell section through which the leadpipe passes.

The valve block may also be supported by valve support means which extend between the bell section and the leadpipe.

The valve support means extends between the bell section and one of the sleeves.

The instrument may be provided with a water valve member which is pivotally mounted on the instrument, the water valve member being spring biased into sealing contact with a drain hole provided in the instrument, the pivotal mount and spring bias of the water valve member being formed integrally with the instrument.

In such a musical instrument the valve member may be provided with a finger pad at one end for depressing by the musician for moving the valve member directly from its first to its second position with the magnetic restoring means acting on the other end of the valve member to restore it to its first position. Alternatively levers and/or linkage mechanisms may be used to operate the valve member or wired or wireless operation of electro-magnetic restoring means may be used.

The present invention will now be described, by way of example only with reference to the accompanying drawings in which:—

FIGS. 11 to 15 show sectional views through the valve members of an alternative valve design which uses magnetic valve control and non-circular cross section valve members;

FIG. 17 shows a horizontal section through a valve block using the non-circular cross section of FIGS. 11 to 16;

FIG. 18 shows a section through one end of the tuning slide of the trumpet showing the O-ring sealing details;

FIGS. 19 and 20 show details of the water valve used on the trumpet;

Figure 1:
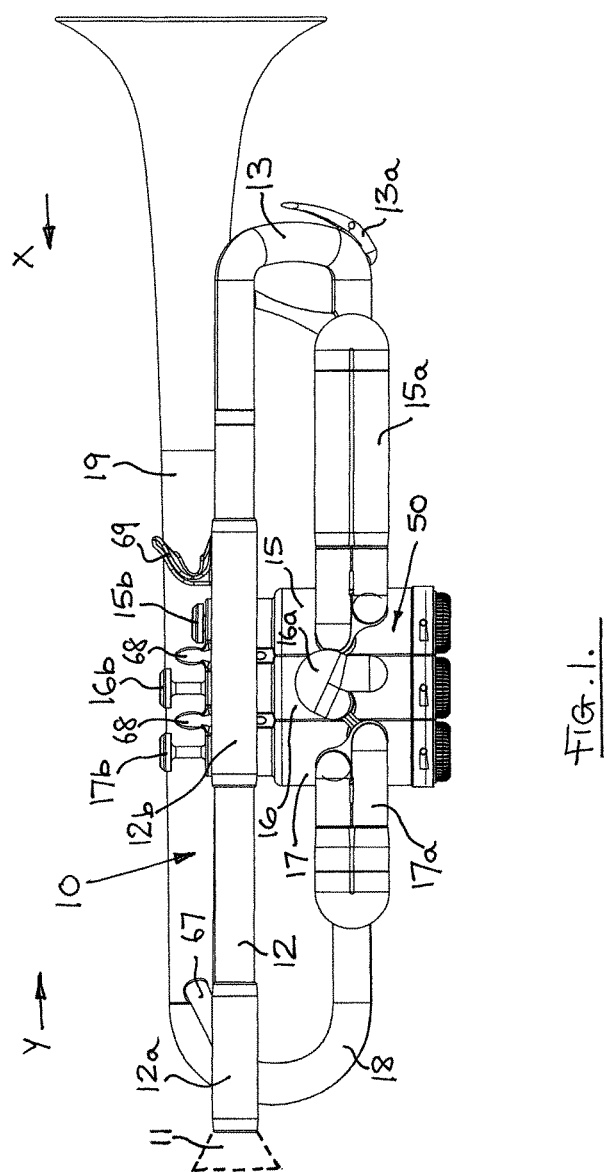
FIG. 1 shows a side view of a plastic trumpet which includes valves in accordance with the present invention.
Figure 2:
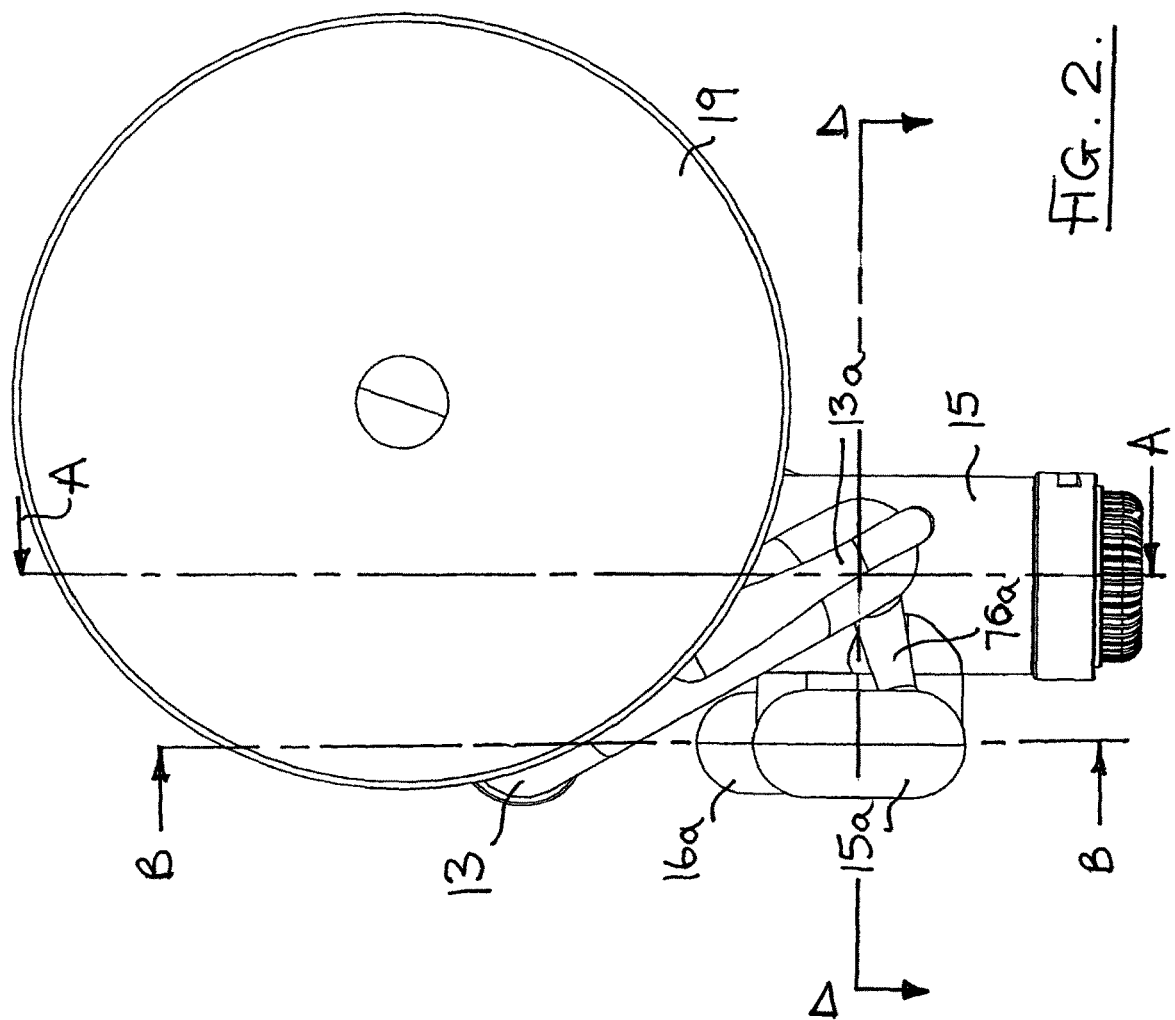
FIG. 2 shows an end view of the trumpet in the direction of the arrow X of FIG. 1.
Figure 3:
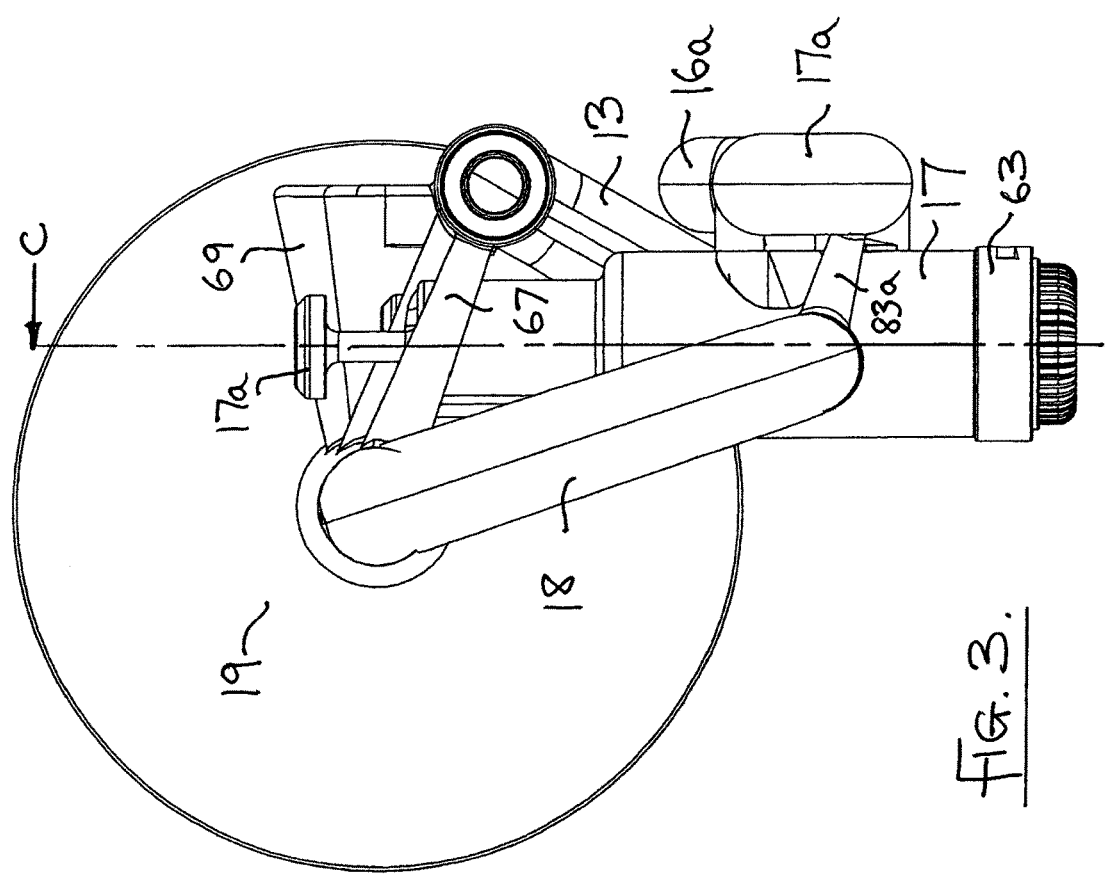
FIG. 3 shows an end view of the trumpet in the direction of the arrow Y of FIG. 1.

Referring to the drawings, a trumpet 10, as is customary, has a mouthpiece 11 (see dotted detail on FIG. 1) supported in a lead pipe section 12 which leads to a tuning slide 13 which includes a water key 13a and hence via a straight section 14 to valves 15, 16 and 17 housed in a valve block 50. From valve 17 air passing through the instrument travels via curved section 18 to a bell section 19. Each valve 15, 16 and 17 has its own valve slide section 15a, 16a and 17a around which the air blown through the mouthpiece 11 is caused to flow when the associated valve is operated by the depression of the appropriate finger pad 15b, 16b and 17b thus providing different notes.

As the valves 15, 16 and 17 of the present invention are of the same construction only the construction of valve 15 will be described in detail.

Figure 5:
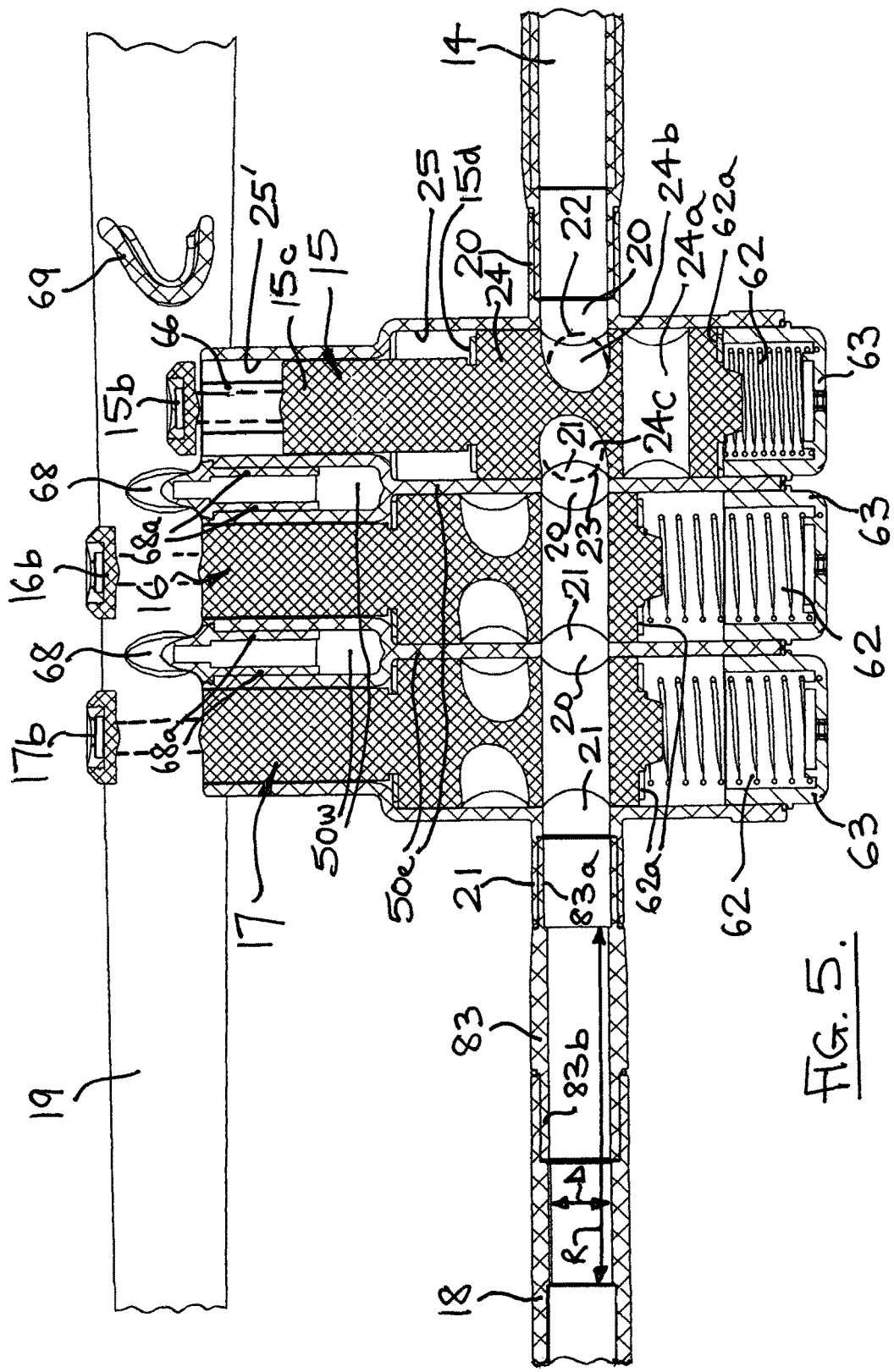
FIG. 5 shows part of a similar section to that of FIG. 4 on a larger scale.
Figure 6:
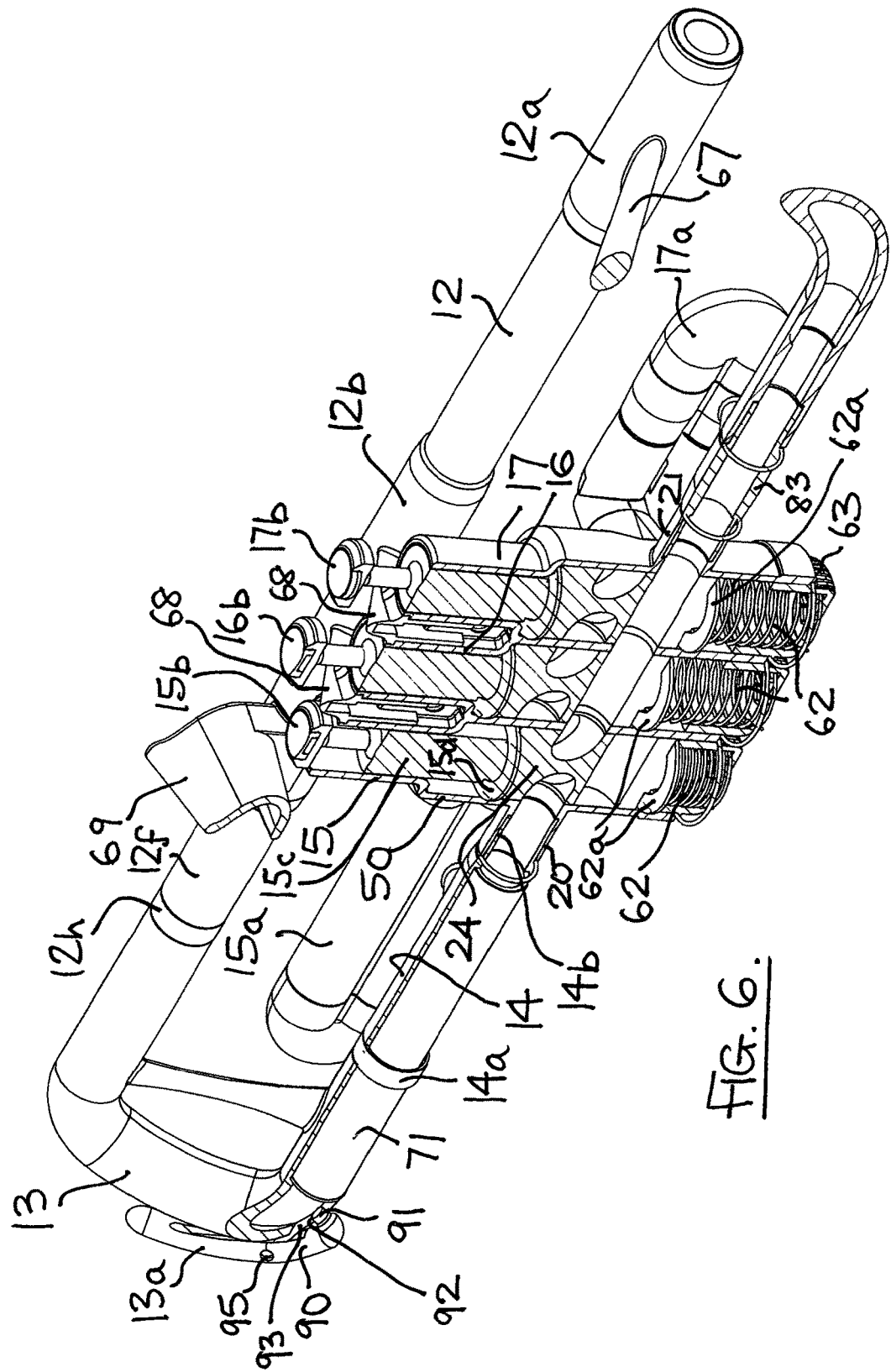
FIG. 6 shows a perspective view of the section on the plane A-A of FIG. 2.

Valve 15 is housed in a casing in the form of valve block 50 (see FIG. 5). Block 50 has a first inlet port 20 connected with pipe section 14 and a first outlet port 21 connected with the first inlet port 20 of adjacent valve 16. Valve block 50 also includes a second outlet 22 leading to the slide section 15a and a second inlet 23 leading back from the slide section 15a. An inner valve member 24 slides within a bore 25 of block 50 and has a finger pad 15b connected to the remainder of the valve member by a stem 15c (see FIGS. 9 and 10) which slides in the upper part 25' of bore 25. A sealing and cushioning washer 15d of polymeric material is supported in a groove around the base of the stem 15c.

Figure 11:
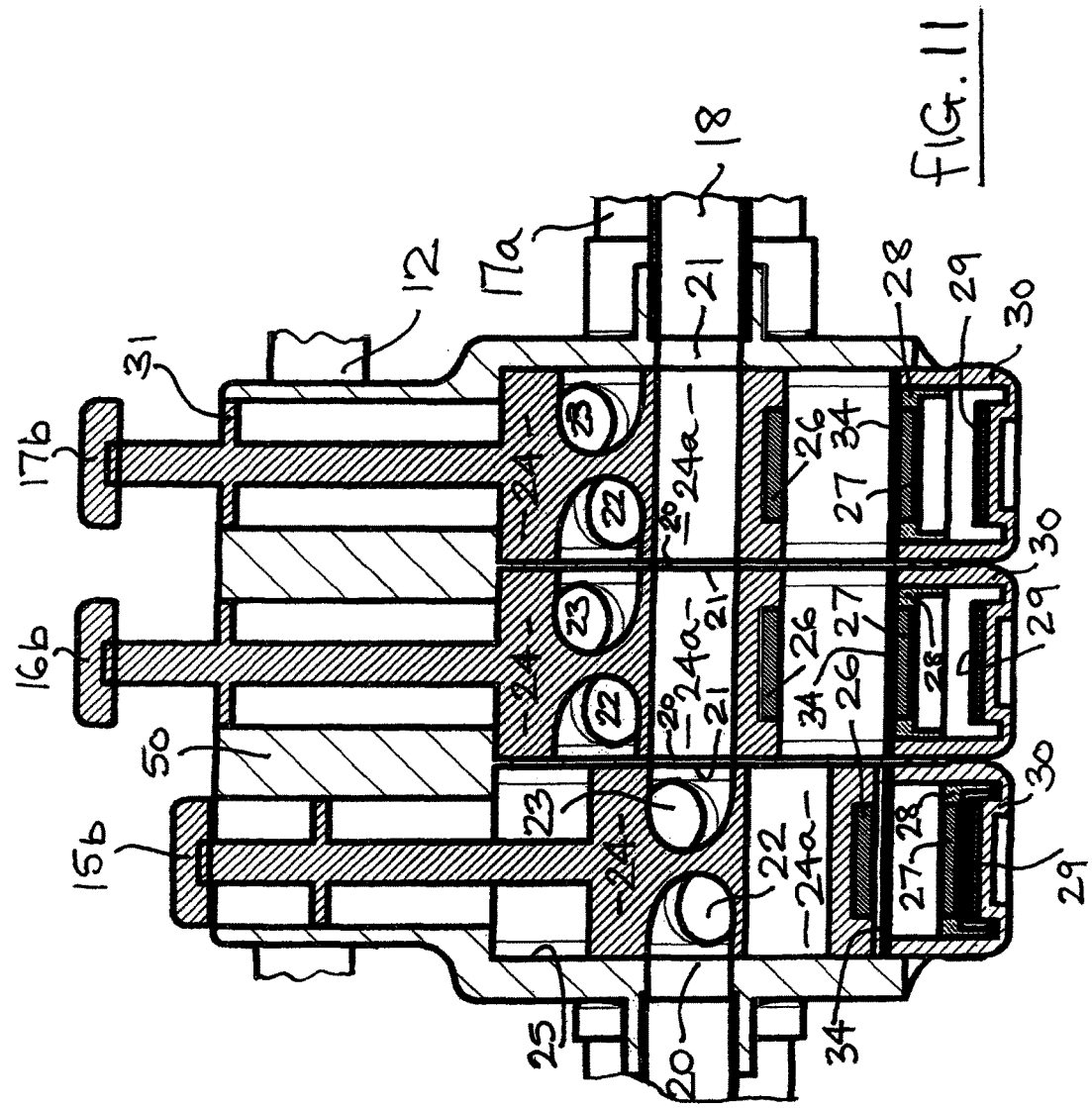
Figure 15:
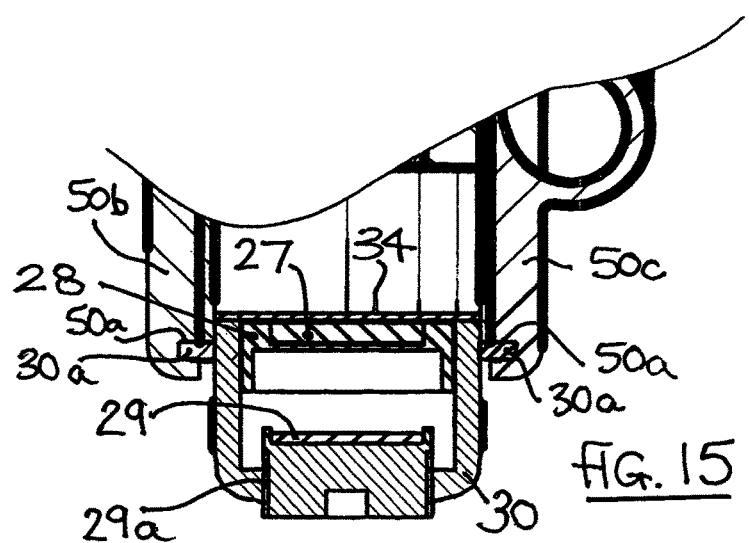

Inner valve member 24 includes a first passage 24a through which air from inlet 20 can flow to the outlet 21 when the valve member is in its first undepressed position shown in FIG. 11.

Figure 4:
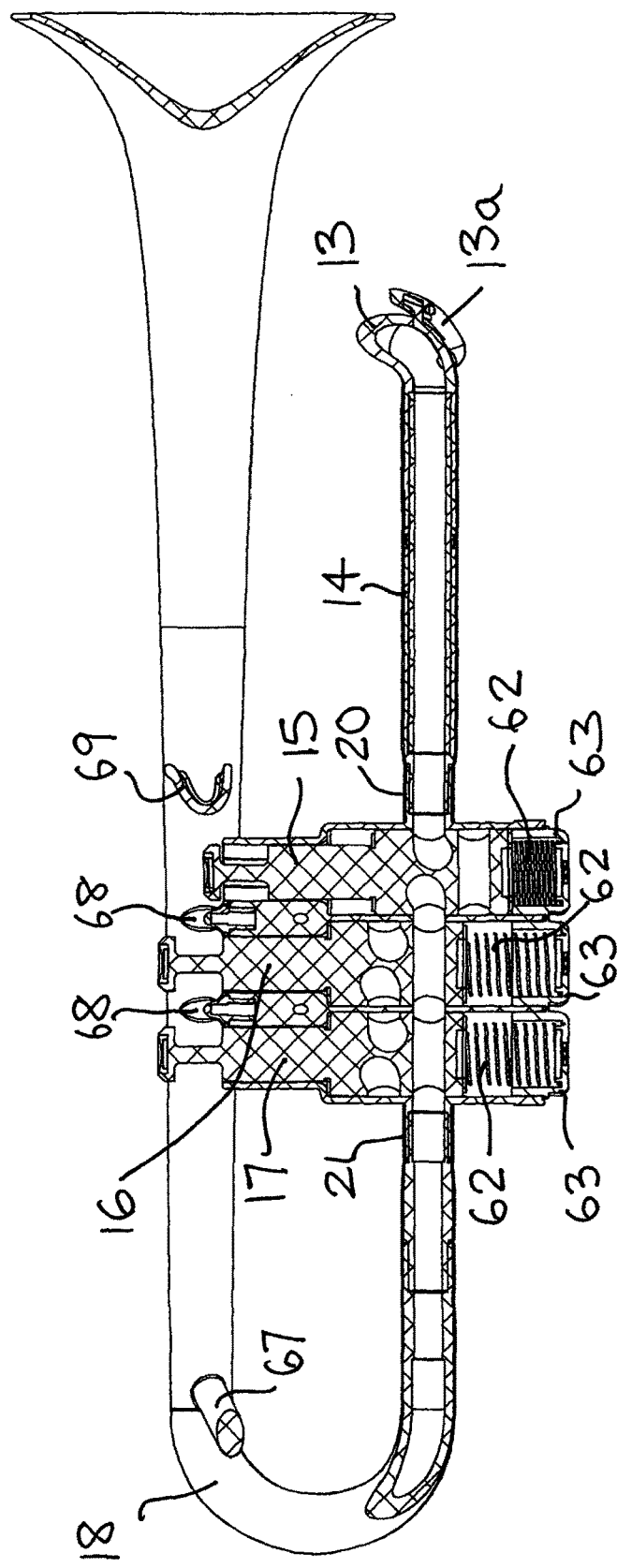
FIG. 4 shows a sectional view on the plane C-C of FIG. 3.

When inner valve member 24 is moved to its second position by the musician depressing finger pad 15b, further passages 24b and 24c in valve member 24 connect first inlet 20 with second outlet 22 and second inlet 23 with first outlet 21 respectively so that air blow through the mouthpiece 11 can travel around section 15a thus generating a different note as shown in FIGS. 4 and 5.

Figure 21:
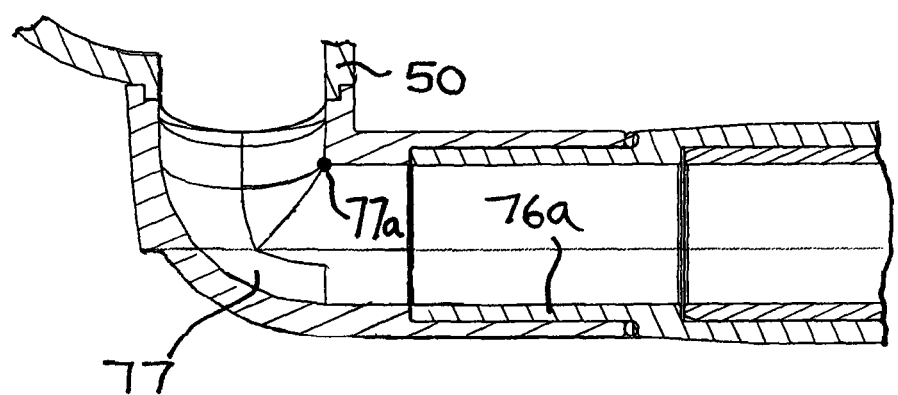
FIG. 21 shows details of the tight bend configuration used both within the valve block and elsewhere on the trumpet when space is restricted.

To reduce the volume within the inner valve member occupied by the bends in the internal passages 24a, 24b and 24c, the internal passage bends may sweep around a centre which is the inside point of the passage bend. This passage bend configuration can also be used outside the inner valve member when space is restricted as shown in FIG. 21 where the passages within twin tube connector 77 (described below) sweeps around centre 77a.

Figure 22:
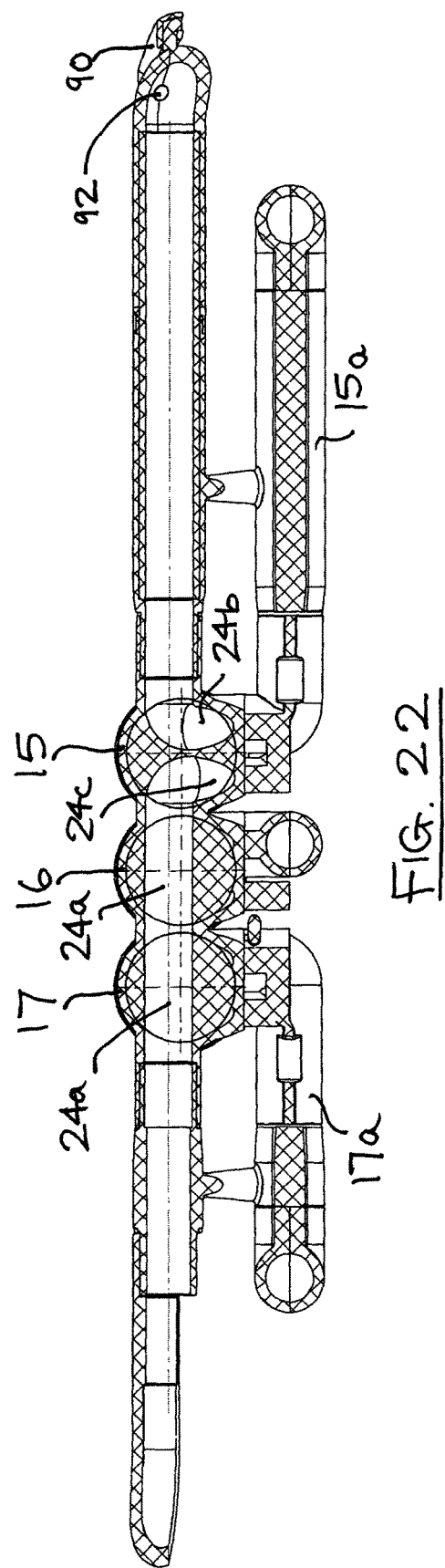
FIG. 22 shows a section on the plane D-D of FIG. 2.

The first passage 24a may be offset from the centre line of the valve member (as best seen in FIG. 22) to provide more room for the second and third passages 24b and 24c through the valve member.

In the arrangement shown in FIGS. 4 to 6 and 9, the inner valve member 24 is of a one piece construction which contains 24a, 24b and 24c and ports 20, 21, 22 and 23. Such a construction can be manufactured, for example, using multi-axis machining techniques as a mono-block construction. Alternatively, the valve member may be injection moulded.

Figure 10:
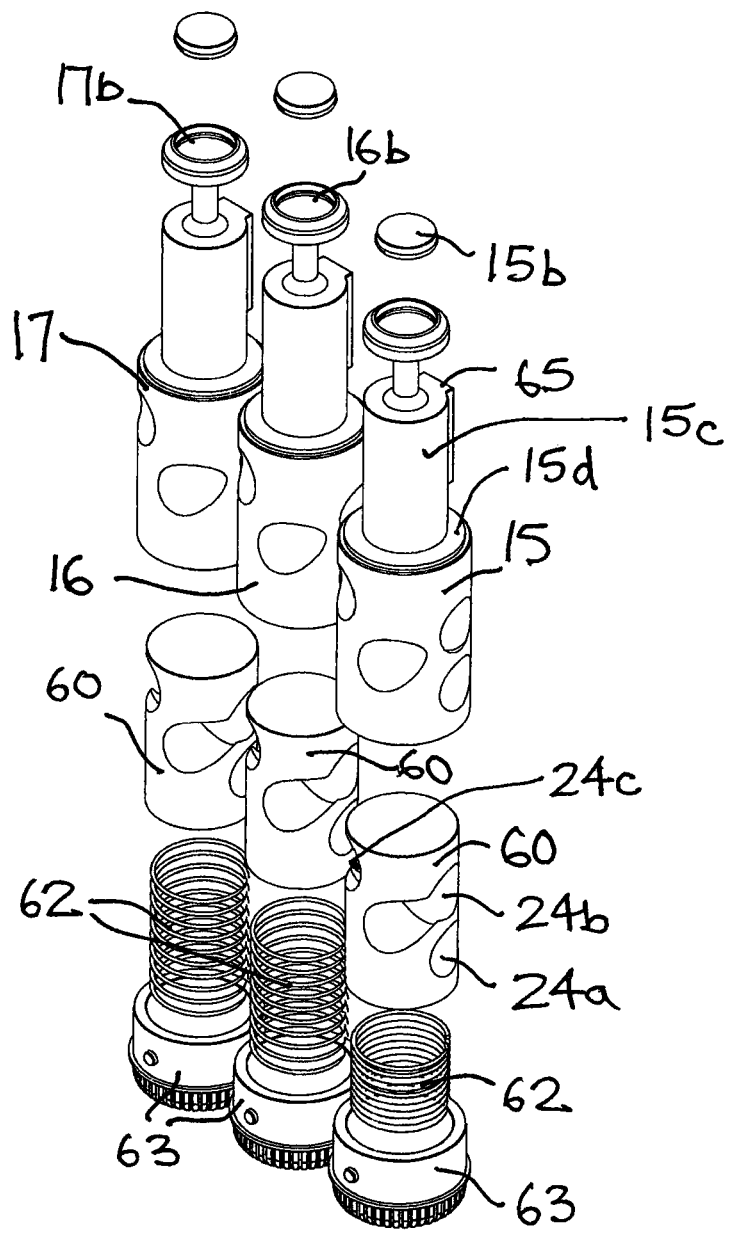
FIG. 10 shows a perspective exploded view of the valve members of the trumpet of FIG. 1.

In an alternative construction, shown in FIG. 10, the valve member 24 is of a two piece construction in which an inner core member 60 contains passages 24a, 24b and 24c and ports 20, 21, 22 and 23, is fixed in a cylindrical bore in the inner valve member part 24. By housing the passages and ports in this separate inner core member 60 manufacture of the more complex parts of the valve member is greatly simplified. In this construction the valve member part 24 may be moulded and the inner core part 60 may be machined. Alternatively both parts 24 and 60 may be moulded.

In a still further alternative construction (not shown), the valve member 24 may have a full length inner core of the same diameter as stem 15c the lower part of which contains part of passages 24a, 24b and 24c. This lower part of the inner core is then surrounded by an outer sleeve which contains the other part of passages 24a, 24b and 24c and the ports 20, 21, 22 1nd 23. In this construction the valve core and the outer sleeve may be moulded or machined. For example, the outer sleeve may be moulded in situ around the inner core.

In all the above inner valve member constructions, where a part is moulded it may be subsequently machined to its final finished form in order to achieve the necessary accuracy.

The movement of the valve member 24 from its first position to its second position is resisted by a compression spring 62 which acts at one end on the base of valve member 24 via washer 62a and at the other end in a removable cap 63 which can be screwed into or otherwise secured to the body 50. The spring force applied by spring 62 can be adjusted by screwing cap 63 into or out of the body thus adjusting the playing action of the valve to suit the instrument player's needs or style.

Valve member 24 has a circular cross section and rotation of the valve member within bore 25 is controlled by a locating rib 65 which extends along the valve member and projects into a locating groove 66 in each valve bore in the valve casing 50.

As will be appreciated, valves 16 and 17 are of a similar construction to valve 15 with their first inlets connected with the first outlet of the previous valve and their second outlets and second inlets connected with the respective slide sections 16a and 17a. There are thin walls 50e provided between the bores 25 of the adjacent valves 15, 16 and 17 (see FIG. 5) although it is envisaged that these thin walls may be eliminated to give an even more compact construction if desired.

Figure 16:
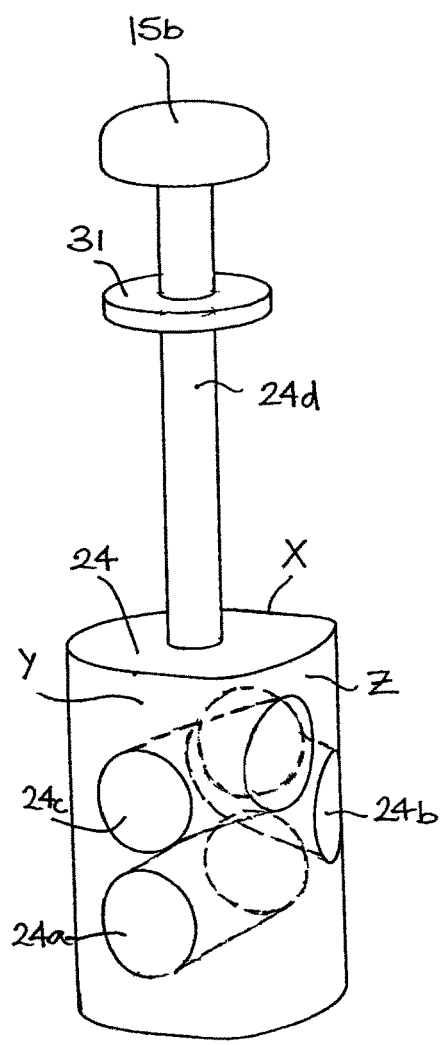
FIG. 16 shows a perspective view of the alternative valve member of FIGS. 11 to 15.

As an alternative the valve member 24 may not be of conventional circular cross section but may have three flattened areas X, Y and Z (see FIGS. 16 and 17) through which the passages 24a, 24b and 24c connect with the various inlets and outlets of the valve. These flattened areas provide good sealing between the valve member and the bore 25 and also allows large lands to be provided between the ends of the passages which simplifies manufacture of the valve member particularly if the valve member is made from plastics material by injection moulding. Additionally, as the valve members are no longer of circular cross section, it is no longer necessary to provide a locating means acting between the valve member and its bore to correctly locate the valve member rotationally and to prevent rotation of the valve member within its bore.

Since the corresponding inlets and outlets for each valve are all orientated in the same positions the valves can be of identical construction which provides an economical construction.

As an alternative to the above spring control of valve member 24, the movement of the valve member 24 from its first position to its second position can be resisted by a magnetic restoring means which comprises a first magnetic means carried on the valve member and a second opposing magnetic means carried by the casing which opposes movement of the valve member away from its first position. A simple magnetic restoring means of this type whilst workable does provide a restoring force which is not linear and which rises exponentially as the valve member is displaced away from the first position.

This non-linear restoring force can be overcome by providing a first magnet 26 (see FIGS. 11 to 15) carried by the valve member 24, a second magnet 27 carried on a member 28 which is slidable in bore 25 and a third magnet 29 which is carried on block 50 by an end plug 30 which is screwed or otherwise secured in block 50.

In the arrangement shown in the drawings end plug 30 has tabs 30a (see FIGS. 12 to 15) which engage by a bayonet type action in slots 50a in removeable side plates 50b and 50c which are screwed to block 50 in this alternative design. First magnet 26 and second magnet 27 are of equal but opposite magnet/electromagnetic power. Third magnet 29 is half the power of magnets 26 and 27 and opposes the movement of the second magnet 27 away from valve member 24 when valve 15 is operated. Using this magnet arrangement a more linear damping force can be provided to resist the movement of valve member 24 when finger pad 15b is depressed. This provides the smooth and consistent valve operation which the musician wishes to experience.

If desired the vertical position of the third magnet relative to the valve casing can be made adjustable so that the musician can customise the valve operation to his own requirements. This can be done, for example, by providing a screw mounting of the magnet 29 in the end plug 30 as shown at 29a in FIG. 15.

Above second magnet 27 a disc 34 of brass is provided to avoid the development of any bacterial activity within the valve stemming from the breath of the musician.

Alternatively plastic valve body 50 or other plastic valve components may have anti bacterial ionic silver or equivalent incorporated into the part to prevent bacteriological activity in this valve design or the earlier design of FIGS. 1 to 10.

The top of the valve bore 25 is closed off by a disc 31 carried on the stem 24d of valve member 24.

As indicated above the valve construction of the present invention is particularly suitable for manufacture from plastics material such as ABS or polycarbonate by injection moulding. In such a plastics valve arrangement the valves 15, 16 and 17 could be separate valves interconnected by short lengths of piping, or, as shown in the accompanying drawings, all three valves could be incorporated into a single valve block 50 so that no separate interconnecting pipes are required.

It is an important feature of the present invention that the valve members 24 are made from lighter plastics material as opposed to the normal metal valves. The lighter weight of a plastics valve member 24 allows the diameter of the valve member to be increased from say 16 mms to 26.5 mms without increasing the inertia of the valve member as compared to a conventional metal valve member so that the speed of operation of the valve is still retained. The larger diameter valve member allows the diameter of the passages through the valve member to be the same diameter (typically 11.7 mms) as the internal diameter of the tubing of the instrument leading up to and away from the valve member.

This smooth flow of air through the inner valve member is further enhanced if the radius of any bends of the passages through the inner valve member are the same as the radius of the passages leading up to and away from the valve member.

It is also envisaged that not only would the valve body 50 and valve members 24 be made from plastics material but also all the connecting pipe sections 13, 14, 15a, 16a, 17a, 18, the lead pipe 12 and the bell 19 could be made from plastics material.

For example, leadpipe 12 is supported from the bell section 19 via two external sleeves 12a and 12b which are connected with the bell section via strut 67 formed integrally with bell section 19 and sleeve 12a and via valve support means 68 and finger support 69 which are formed integrally with bell section 19 and sleeve 12b. Valve support means 68 have pads 68a which embrace the sides of the upper part of the valve block 50 and are glued or otherwise secured thereto. Pads 68a includes slots which fit over webs 50w provided between the three valves of the block. This support of the leadpipe 12 and valve block 50 from the bell section 19 greatly improves the rigidity of the instrument.

Leadpipe 12 is a single piece moulded component which includes a mouthpiece support socket 12c, with a double tapering bore 12d including a lead pipe restriction 12e, in accordance with co-pending published PCT patent application No. WO2010/122289. Tube 12 also includes a tuning slide outer portion 12f. Alternatively the tube 12 can be made as described in the above referred to PCT application by wrapping uncured fibre reinforced material around a two piece double tapering mandrel and then curing the material to provide the necessary lead pipe restriction. In a further alternatively method of construction, the material may be wrapped around a single tapering mandrel and then one end may be internally machined to create the double taper and restriction. In a yet still further alternative method of construction a two piece double tapering insert can be used within an injection moulding tool to provide the lead pipe restriction and double taper.

Tuning slide 13 has a projecting tube 70 (see FIGS. 9 and 18) which slides within portion 12f of leadpipe 12. The sliding contact of tube 70 within tube portion 12f is sealed by an O-ring 12g carried in a retaining cap 12h which is retained on the end of tube 12f by a groove 12i and a corresponding circular rib 12j on cap 12h.

Similarly the other end of tuning slide 13 has a projecting tube 71 which slides within tube 14 and is sealed thereto by an O-ring carrying retaining cap 14a (similar to cap 12h) which is retained on the end of tube 14. End portion 14b of tube 14 enters inlet 20 provided on the valve block 50.

Figure 20:
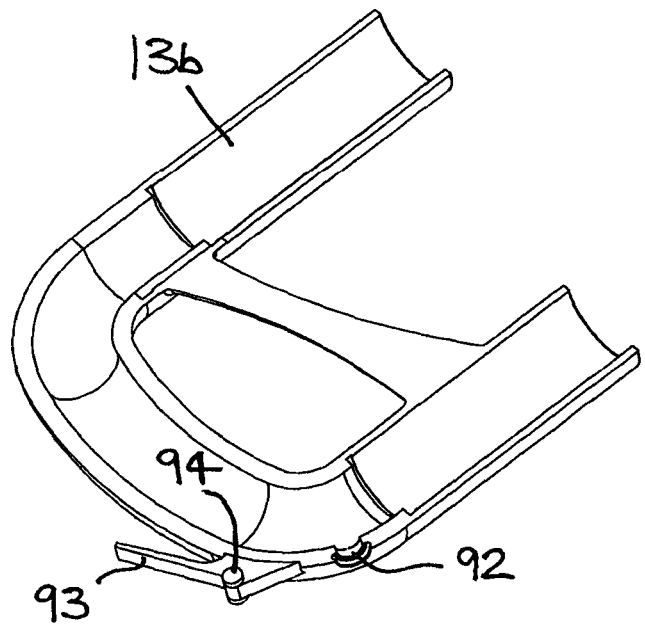

Thus projecting tubes 70 and 71 slide within the ends of tubes 12 and 14 as tuning slide 13 is moved. The main body portion of tuning slide 13 is made in two halves 13b and 13c. Half 13b (see FIGS. 19 and 20) carries water valve 13a. Water valve 13a has a main body member 90 which carries a circular plug 91 carrying an O-ring which enters and seals a hole 92 formed part in part 13b and part in half 13c through which spit which collects within the instrument can be emptied when valve 13a is opened as is conventional. Part 13b also provides an integrally formed plastics spring leaf 93 which biases the valve member 90 towards its closed position and a pivot member 94 which snaps into holes 95 in member 90 to mount the water valve on the tuning slide.

Figure 7:
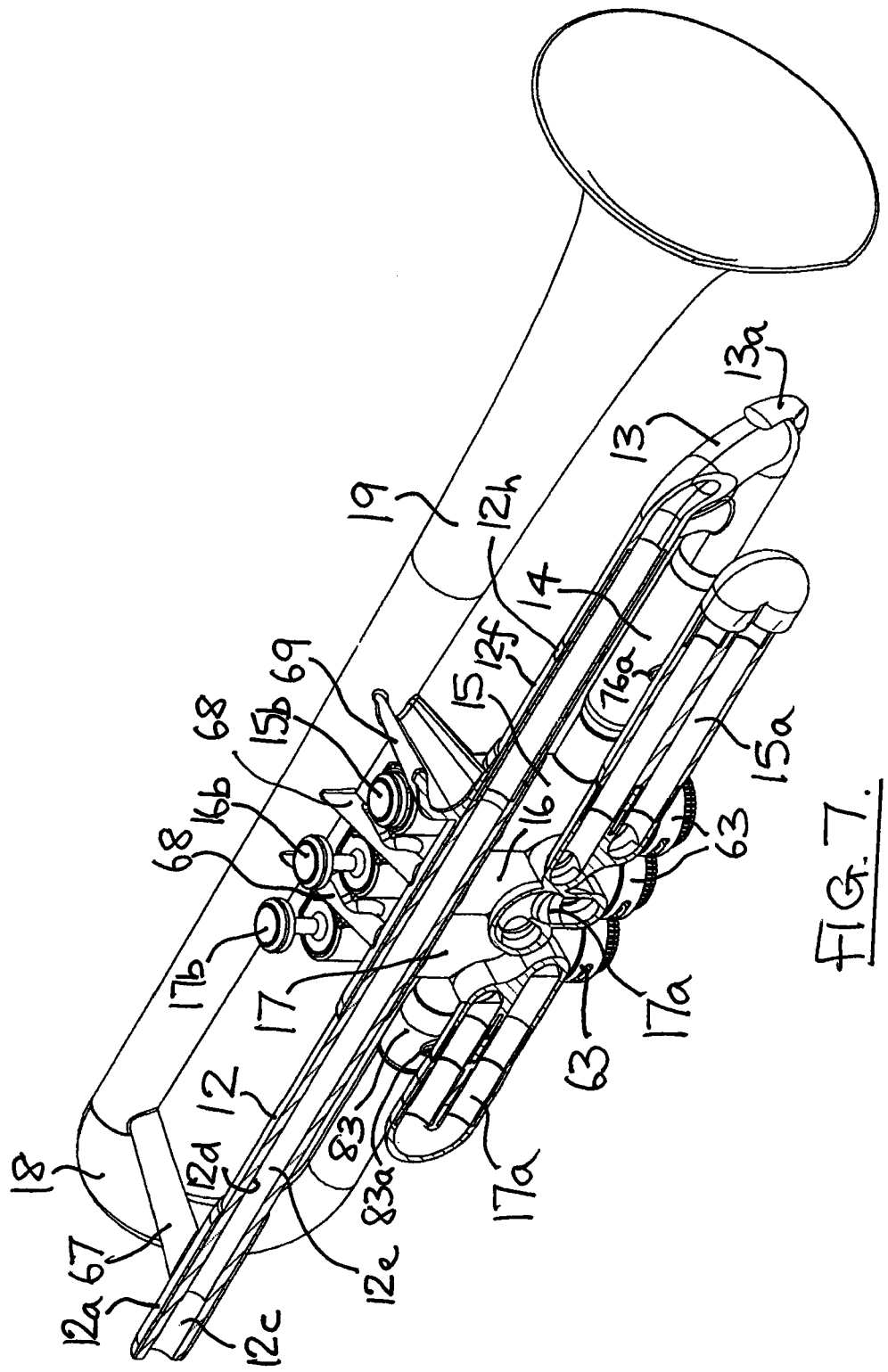
FIG. 7 shows a perspective view of the section on the plane B-B of FIG. 2.
Figure 8:
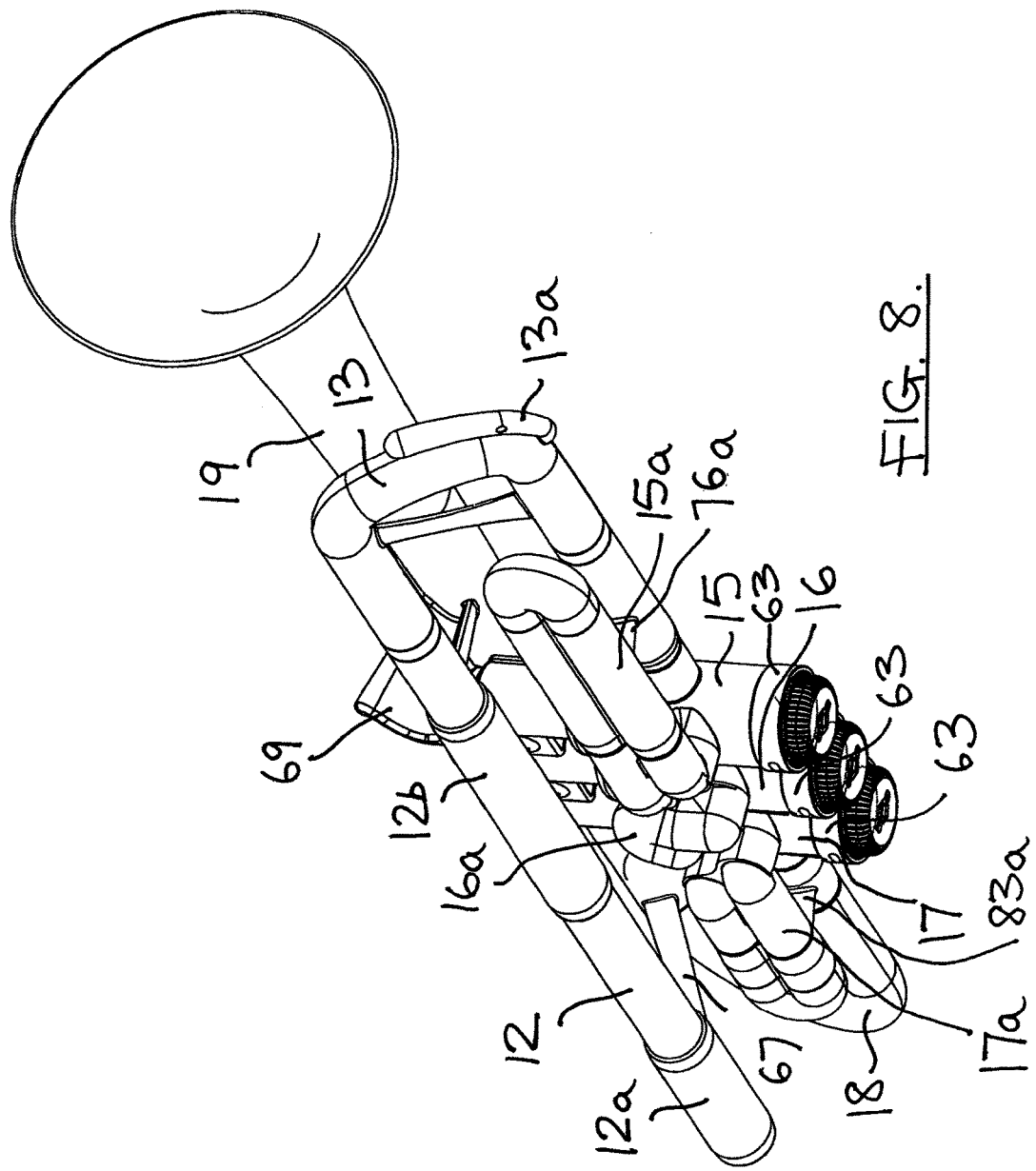
FIG. 8 shows a perspective view of the trumpet of FIG. 1 from below.
Figure 9:
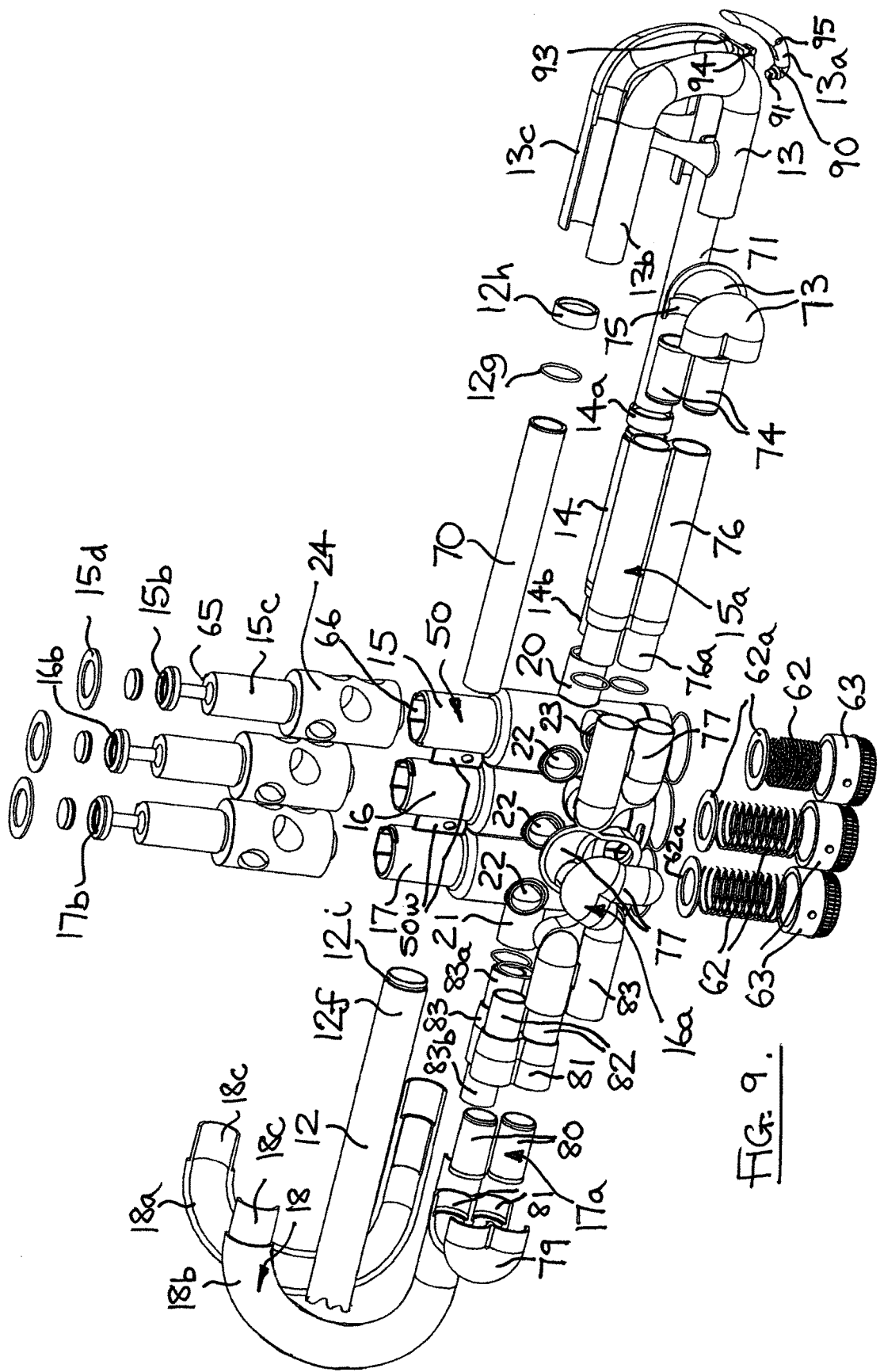
FIG. 9 shows a perspective exploded view of some of the component parts of the trumpet of FIG. 1.

As can be seen from FIGS. 7 and 9, the valve slide section 15a is again made as a multi-part plastics moulding. The section 15a comprises a two piece end part 73 which permanently receives projecting tubes 74 in sockets 75. Tubes 74 in turn slide in one end of a single twin tube section 76. Twin tube section 76 has end portions 76a which are permanently secured into a single piece twin tube connector 77 which mates with ports 22 and 23 of the first valve 15. Twin tube section 76 is also supported from tube section 14 via projection 76a.

Valve slide section 16a is made up from two parts 77 which are permanently secured together and which mate with ports 22 and 23 of the second valve 16. Due to the small size of the section 16a it has no sliding parts for ease of manufacture but the sliding function could be incorporate in section 16a is found necessary.

Valve slide section 17a is again made as a multi part plastics moulding. The section 17a comprises a two piece end part 79 which permanently receives projecting tubes 80 in sockets 81. Tubes 80 in turn slide in one end of a single twin tube section 81. Twin tube section 81 has end portions 82 sealed by O-rings 82a and which are permanently secured into a single piece twin tube connector 83 which mates with ports 22 and 23 of the third valve 17. Twin tube section 81 is also supported from short tube section 83 via projection 83a.

As indicated above, the outlet 21 of valve block 50 is joined with the curved section 18 by a short tube section 83 which has reduced diameter end portions 83a and 83b received into the outlet 21 and curved section 18 respectively (see FIGS. 5 and 9).

Curved section 18 is again moulded as a two pieces 18a, 18b which have a reduced diameter ends 18c received in a recess in the end of the bell section 19.

As can be seen from the drawings, great care is taken to ensure that the diameter of the air passages in the instrument from the end 12f of the leadpipe 12 remain the same (typically 11.7 mm) to improve air flow as discussed above. In the design illustrated a restriction of diameter D and length R has been deliberately introduced into the connector 83 and the first part of curved section 18 (see FIG. 5) to improve the tone of the instrument.

As can best be seen from the above, the connections between the valves 15, 16 and 17 will be axially aligned whether separate valves or a valve block type of construction is used. This promotes a good smooth flow of air through the instrument.

It is a particular advantage of the alternative magnetic valve arrangement described above that the fatigue failure of the metal restoring springs normally found in such valves is avoided.

Also, as indicated above, the valves can be operated directly by the finger pads 15b, 16b and 17b or in some instruments via levers and/or linkage mechanisms. Also, in some instruments/applications, the magnetic restoring means may be of the electromagnetic type with wired or wireless operation and with electrical or electronic input and/or output applied to and/or received from the electromagnetic restoring means to enable remote operation of the valves.

It will also be appreciated that the magnet/electromagnetic valve damping arrangement of the present invention can be used in valves other than for musical instruments for pneumatic and hydraulic applications.

The invention claimed is:

1. A fluid flow control valve comprising an outer casing with an inner valve member displaceable between first and second positions within a bore in the casing, the valve member including passages which interconnect different valve inlets and outlets dependent on whether the valve member is in its first or second position, the inner valve member being acted upon by a restoring means in the form of a first magnetic means carried on the valve member a second magnetic means carried by the casing which opposes movement of the valve member away from its first position, the second magnetic means being moveably mounted on the casing so that the second magnetic means moves away from the valve member as the valve member is moved away from its first position and a third magnetic means is mounted on the casing which opposes the movement of the second magnetic means away from the valve member to provide a more linear restoring force on the valve member.

2. The valve according to claim 1, wherein the position of the third magnetic means relative to the casing is adjustable to enable the restoring force to be adjusted.

3. The valve according to claim 1, wherein the magnetic restoring means is of wired or wireless electro-magnetic form.

4. The valve according to claim 3, wherein the electromagnetic restoring means has an electrical or electronic input and/or output to enable remote operation of the valves.

5. A valve assembly comprising a series arrangement of valves housed in a common block or outer casing, wherein each valve is a fluid flow control valve suitable for use in a musical instrument;
   wherein each valve comprises an outer casing with an inner valve member displaceable between first and second positions within a bore in the casing, the valve member including passages that interconnect different valve inlets and outlets dependent on whether the valve member is in its first or second position, the inner valve member being acted upon by a restoring means that tends to return the valve member towards its first position when displaced therefrom;
   wherein the inner valve member is made from plastics material, and has an outer plastics surface that slides on a cooperating surface of the bore; and
   wherein each valve of the assembly has a first inlet for incoming air and a first outlet leading to a bell section of an associated instrument which are connected for the flow of air via the valve member when the valve member is in its first position, the valve having a second outlet to an additional pipe loop and a second inlet leading back from the pipe loop to the valve which allow flow of air around the additional pipe loop and back to the first outlet via the valve member when the valve member is in its second position, the first outlet of one valve being connected to the first inlet of the next valve in the series arrangement and these connections between adjacent valves being axially aligned for smother flow through the valve assembly.

6. A musical instrument comprising:
   a mouth piece supported in a lead pipe, leading to a tuning slide, leading to a valve block including three valves in series and associated valve slide sections, the valve assembly leading to a bell section, the lead pipe, tuning slide, valve block, valves, associated valve slide sections and bell and all connecting tubing being molded from plastics material;
   wherein each valve comprises an outer casing with an inner valve member displaceable between first and second positions within a bore in the casing, the valve member including passages that interconnect different valve inlets and outlets dependent on whether the valve member is in its first or second position, the inner valve member being acted upon by a restoring means that tends to return the valve member towards its first position when displaced therefrom; and wherein the inner valve member is made from plastics material, and has an outer plastics surface that slides on a cooperating surface of the bore.

7. The instrument according to claim 6, wherein the lead pipe is supported from the bell section by sleeves carried by the bell section through which the lead pipe passes.

8. The instrument according to claim 6, wherein a water valve member is pivotally mounted on the instrument, the water valve member being spring biased into sealing contact with a drain hole provided in the instrument, the pivotal mount and spring bias of the water valve member being formed integrally with the instrument.

9. The instrument according to claim 6, wherein the valve block is also supported by valve support means which extend between the bell section and the lead pipe.

10. The instrument according to claim 9, wherein the valve support means extends between the bell section and one of the sleeves.

11. A fluid flow control valve suitable for use in a musical instrument in which air is blown through the valve via tubing and hence to an instrument bell, the valve comprising an outer casing with an inner valve member displaceable between first and second positions within a bore in the casing, the valve member including passages which interconnect different valve inlets and outlets dependent on whether the valve member is in its first or second position, the inner valve member being acted upon by a restoring means which tends to return the valve member towards its first position when displaced therefrom, the diameter of the passages through the inner valve member being of the same diameter as that of the tubing of the associated instrument leading up to and away from the valve member.

12. The valve according to claim 11, wherein the inner valve member includes a plastic core fixed in a bore in an outer portion of the plastics inner member, the insert containing all the passages.

13. The valve according to claim 11, wherein the outer casing is also made from plastics material as a single piece moulding and defines a plastics bore within which the plastics inner valve member makes sliding contact.

14. The valve according to claim 11, wherein the valve member has a non-circular cross section and slides in a complementary non-circular bore in the casing, the cross-section of the valve member and casing bore having flatter areas where the various inlets, outlets and passages are located.

* * * * *